No. 697,861. Patented Apr. 15, 1902.
W. H. MacCOLLIN.
MECHANICAL CALCULATOR.
(Application filed Jan. 7, 1902.)

(No Model.) 2 Sheets—Sheet 1.

Witnesses:—
Hamilton D. Turner
Chas. Welon.

Inventor:—
William H. MacCollin,
by his Attorneys;
Howson & Howson

No. 697,861. Patented Apr. 15, 1902.
W. H. MacCOLLIN.
MECHANICAL CALCULATOR.
(Application filed Jan. 7, 1902.)
(No Model.) 2 Sheets—Sheet 2.

Witnesses:

Inventor:-
William H. MacCollin,
by his Attorneys;
Howson & Howson

UNITED STATES PATENT OFFICE.

WILLIAM H. MacCOLLIN, OF PHILADELPHIA, PENNSYLVANIA, ASSIGNOR TO THE WARREN-EHRET COMPANY, OF PHILADELPHIA, PENNSYLVANIA, A CORPORATION OF PENNSYLVANIA.

MECHANICAL CALCULATOR.

SPECIFICATION forming part of Letters Patent No. 697,861, dated April 15, 1902.

Application filed January 7, 1902. Serial No. 88,771. (No model.)

*To all whom it may concern:*

Be it known that I, WILLIAM H. MACCOLLIN, a citizen of the United States, residing in Philadelphia, Pennsylvania, have invented certain Improvements in Mechanical Calculators or Scales, of which the following is a specification.

My invention relates to a device for performing calculations mechanically. It has been devised particularly for use by architects for the purpose of calculating the number of steps of definite height or riser between floors of houses and other buildings when the space between such floor is known.

My invention further includes an additional scale for use in connection with the "riser-scale" to indicate the "treads" for such risers.

My invention is fully illustrated in the accompanying drawings, in which—

Figure 1:
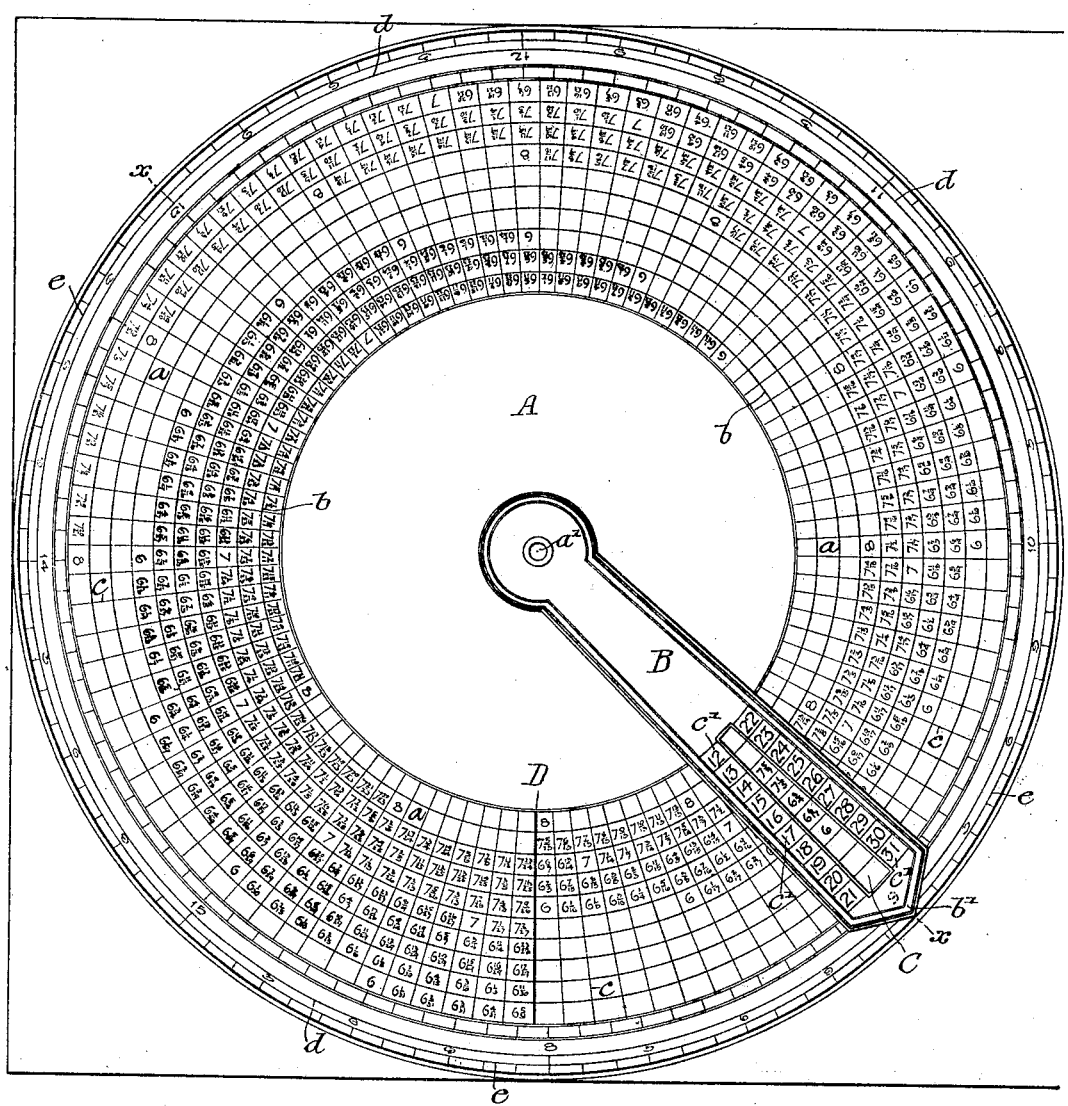
Figure 2:
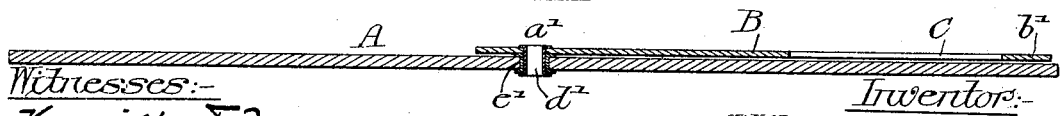
Figure 3:
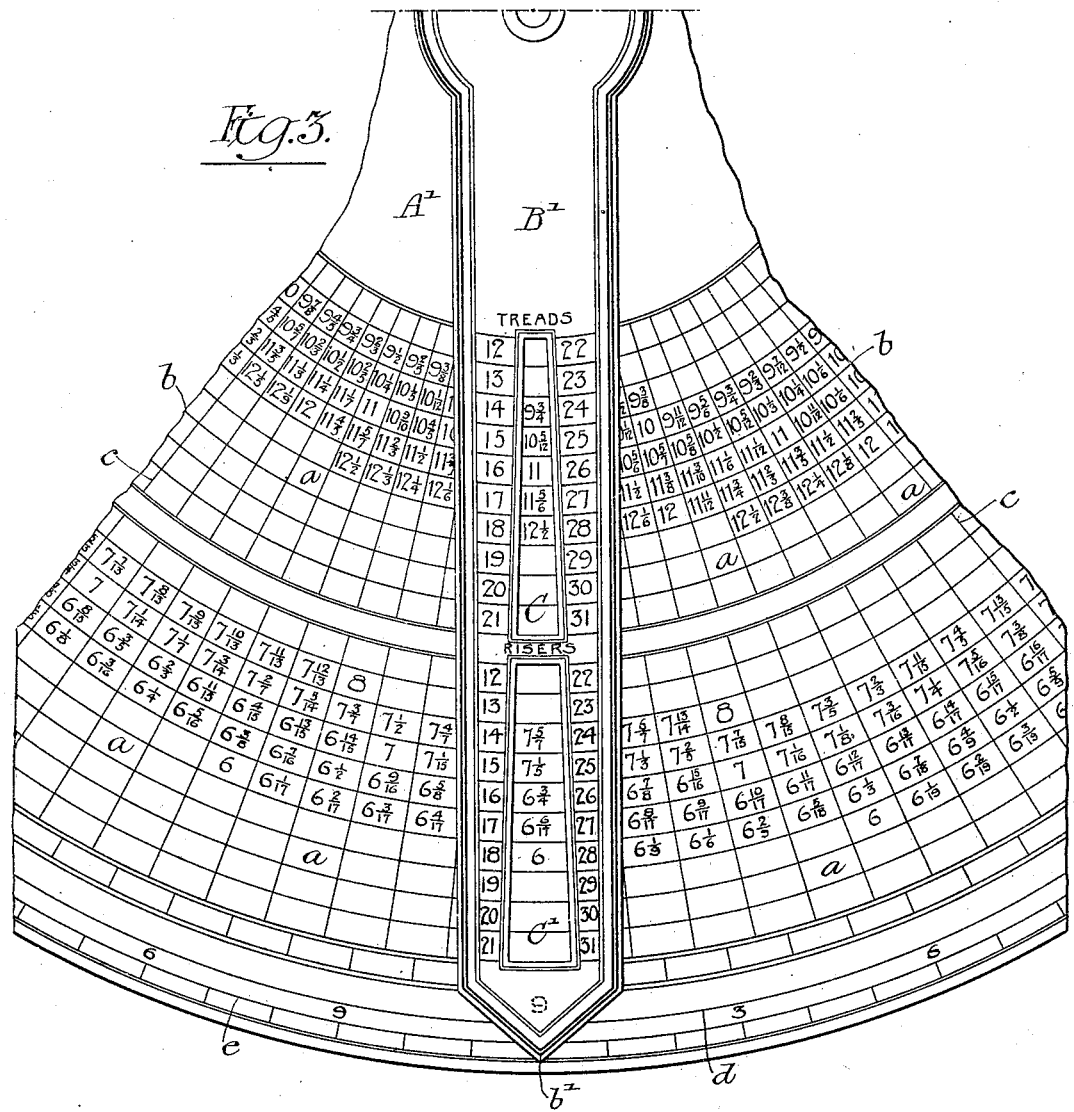
Figure 4:
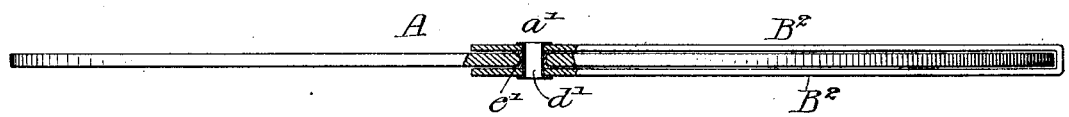

Figure 1 is an elevation or face view of the structure forming the subject of my invention, showing the dial or disk containing the series of predetermined dimensions and the pointer used in connection with the same. Fig. 2 is a sectional view of the structure shown in Fig. 1, taken on the line $x\ x$. Fig. 3 is an elevation or face view of a portion of a dial or disk and a duplex pointer, illustrating a modification of my invention; and Fig. 4 is an edge view, partly in section, of a dial or disk with a duplex pointer, illustrating another modification of my invention.

In the accompanying drawings, A represents a dial or disk having a number of spaces $a$ formed by concentric lines $b$ and radial lines $c$, each of which has a common center $a'$. Within certain of the spaces $a$ formed by the concentric and radial lines figures are written representing "stair-riser" dimensions in inches and fractions of an inch. Exterior to the series of concentric lines $b$ are the lines $d$ and $e$, the latter being divided into equal spaces representing feet, while the former are divided into equal spaces representing inches.

Pivotally mounted at the center $a'$ of the dial or disk A and free to rotate with relation thereto is the pointer or arm B, having a slot C, upon either side of which a row of spaces $c'$ is placed, containing a series of numbers, said pointer having at its end opposite the pivot a point $b'$. The dial and pointer are connected together, so as to be movable with relation to each other, and either may be fixed, as may be most desirable to the user. The pointer is secured to the dial or disk by means of a tubular rivet $d'$, and in order that the movement of either of these parts with relation to the other may not cause appreciable wear the dial or disk is provided with a tubular rivet $e'$, forming a bearing for and within which the rivet $d'$, holding the pointer, is placed.

The figures on the concentric lines $d$ and $e$ are to indicate the height of the houses or other buildings between floors. The figures in the spaces $a$ indicate in inches the possible height of the stair-risers, while the figures on the pointer or arm indicate the number of steps which may have risers of different heights between floor-spaces of known height.

In general practice it may be noted that stair-risers range from six to eight inches. Only in rare instances are dimensions greater or less than these employed, and hence my improved scale has been devised for use between these extremes of height for the stair-riser. It will be understood, however, that other dimensions may be provided for by multiplying the dimensions to be found upon the scale or by adding other groups of figures thereto on either side of those found on the disk in regular ascending or descending progression, which may be readily determined from the other dimensions.

The disk or dial shown in Fig. 1 is provided with two sets of numbers within the spaces $a$, and dividing these sets of numbers is the heavy radial line D. To the right of this line the numbers in the small spaces are to be read in connection with the numbers on the pointer at the left of the slot in the same, while the numbers in the spaces to the left of the line D are to be read in connection with the numbers carried by the pointer at the right-hand side of its slot.

The scale is employed in the following manner: Suppose, for instance, a house or other building under construction is to have floors nine feet apart. To find the number of steps or stairs and the height of the risers of the same, we turn the pointer of the scale until its outer end $b'$ lies directly over the figure "9" in the outer concentric circles. Reading then the dimensions showing through the slot in the pointer in connection with the numbers carried by the pointer to the left of the slot, we find that in the nine-foot space between the floors eighteen steps can be laid with six-inch risers, fifteen steps with seven and one-fifth inch risers, or fourteen steps with seven and five-sevenths inch risers, and so on. If the space between the floors is nine feet six inches, the pointer is moved to the six-inch mark beyond the nine-foot mark and the numbers read as before, and so on throughout the scale. When it is desired to divide a floor of greater height—say, for instance, fifteen feet nine inches—the dimensions in the spaces $a$ to the left of the line D will be read in connection with the figures on the right-hand side of the pointer. For this dimension there may be thirty-one steps having six and three thirty-firsts inch risers, thirty steps with six and three-tenths inch risers, and so on up to twenty-four steps with seven and seven-eighths inch risers. In architectural practice a certain rule is followed with regard to the relation of a stair-riser with the tread, and this relation is such that the multiplication of the one by the other should equal or nearly equal, but never exceed, seventy-five square inches.

My improved scale as arranged and as shown in Fig. 1 is designed solely to denote the stair-riser. I may provide with it, however, an additional scale to be above or below the scale indicated by the dimensions in the spaces $a$. For instance, in Fig. 3 I have shown an additional scale for stair-treads arranged within the riser-scale, or I may provide two pointers firmly secured together at their pivotal point by suitable means passing through an aperture at the center of the dial or disk, as clearly shown in Fig. 4, and on each face of such dial or disk show a series of dimensions registering with each other, the set of such dimensions on one side representing the risers, while the set on the other side represents the tread of the step.

In Fig. 3 I have shown a view of a dial or disk $A'$ having on one face the dimensions for both risers and treads, the latter being arranged near the center of the disk. With this form of scale a single pointer $B'$ is employed, having two slots C and C', both of which have the same figures disposed at either side.

In Fig. 4 I have shown an edge view, partly in section, indicating a form of scale comprising a dial or disk with a pointer or arm $B^2$, comprising a continuous member, which is bent so that it may be disposed on each face of the dial or disk, and the free ends of this pointer have a pivotal connection similar to the other pointers.

Although I have shown and described my scale as one having dimensions arranged in concentric rows, I do not wish to be limited to such form of structure, as I may employ a square or rectangular chart, with a pointer arranged to move at right angles to the same, such form of structure having marks and dimensions similar in all respects to the disk or dial scale.

By the use of a scale of the character devised by me all trouble of plotting the necessary steps, together with the mathematical calculations involved, is dispensed with and a great saving of valuable time effected.

Having thus described my invention, I claim and desire to secure by Letters Patent—

1. A calculating device comprising a chart of suitable form having a series of spaces, certain dimensions marked within said spaces, lines adjacent to, but beyond the spaces containing the dimensions, such lines being divided into parts of equal length, a division-line for the dimensions marked within the spaces of the chart, the said dimensions differing in character on either side of said division-line, and a pointer suitably mounted with relation to the chart, one of said members being movable with respect to the other, said pointer having an opening equal to one row of spaces and having also a series of numbers disposed on either side of said slot, which numbers are to be read when the end of the pointer is opposite one of the markings of the outer lines, in connection with the numbers viewed through said opening, the numbers on one side of said slot being read in connection with the dimensions on one side of the dividing-line, and vice versa.

2. A calculating device consisting of a disk having a series of spaces formed by radial and concentric lines having a common center, certain dimensions marked in said spaces, outer concentric circles divided into a series of spaces of equal length, a division-line for the dimensions marked within the spaces of the disk, the said dimensions differing in character on either side of said division-line, and a pointer mounted at the center of the dial or disk, one of said members being movable with respect to the other, said pointer having a slot overlying the series of dimensions marked within the concentric spaces, and having also a series of numbers disposed on either side of said slot, which numbers are to be read, when the end of the pointer is opposite one of the markings of the outer circle, in connection with the numbers viewed through said slot, the numbers on the left-hand side of said slot being read in connection with the dimensions in the spaces to the right of the dividing-line, and vice versa.

3. A calculating device having a series of spaces with dimensions therein representing "stair-risers," another series of spaces with dimensions therein representing "stair-treads," marks arranged beyond said spaces to indicate heights between floors, and a slotted pointer carrying certain figures indicating the number of steps, the dimensions of "risers" and "treads" being viewed through the slot of the pointer when the end of the same is brought opposite one of the marks indicating the height between floors.

In testimony whereof I have signed my name to this specification in the presence of two subscribing witnesses.

WM. H. MacCOLLIN.

Witnesses:
MURRAY C. BOYER,
JOS. H. KLEIN.